Sept. 7, 1937. J. H. ROBERTSON 2,092,358
TUBULAR JOINT
Filed Jan. 23, 1936 2 Sheets-Sheet 1
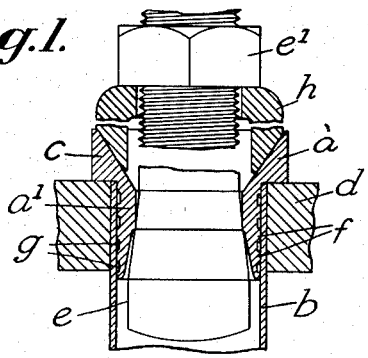
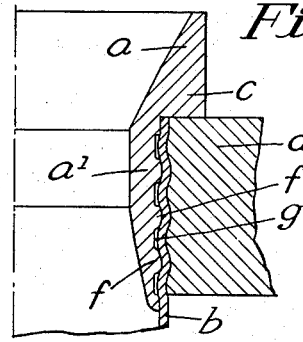
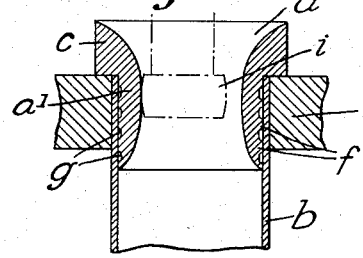
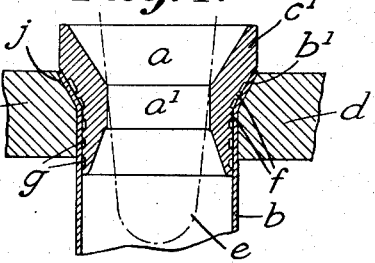
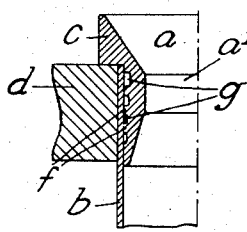
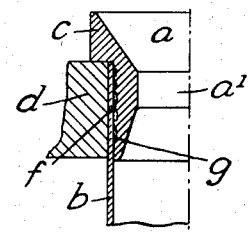
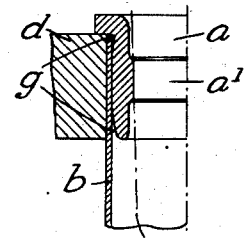
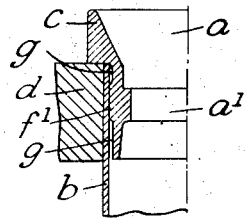
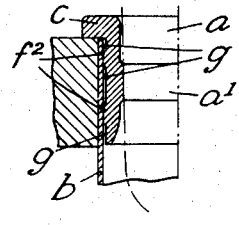
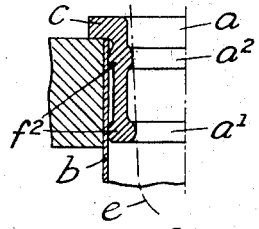
Inventor:—
John H. Robertson,
By:- Smith, Michael & Gardiner
Attorneys.

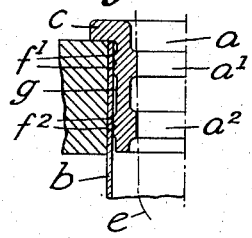
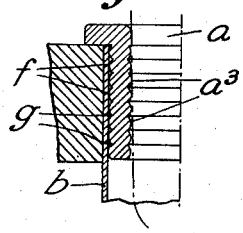
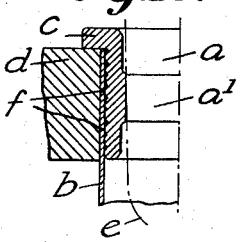
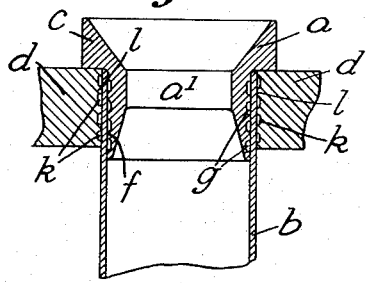
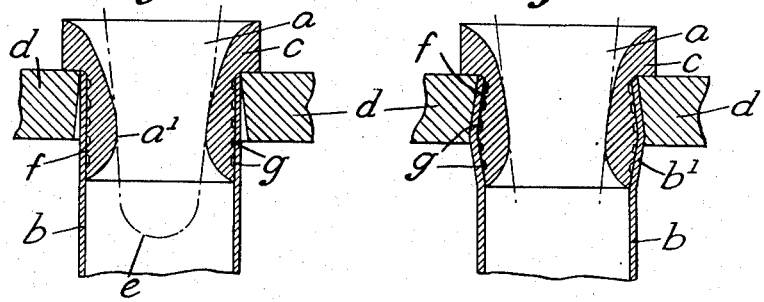
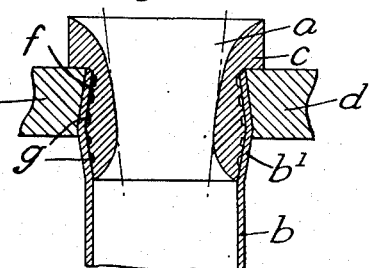
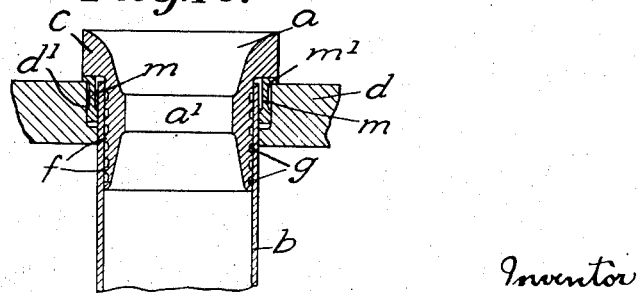

Patented Sept. 7, 1937

2,092,358

UNITED STATES PATENT OFFICE 2,092,358

TUBULAR JOINT

John Hogg Robertson, London, England

Application January 23, 1936, Serial No. 60,539
In Great Britain February 18, 1935

5 Claims. (Cl. 285—56)

This invention has reference to joints for fixing metal tubes or tubular elements together or for fixing tubes in plates. It has for object to provide a fluid-tight seal in a simple and effective manner and it is particularly applicable to tubular joints for heat exchangers of all kinds, such as surface condensers.

The invention is hereafter more fully described with reference to the accompanying drawings, in which:

Fig. 1 is a sectional view of a tube end mounted in a plate and fitted with a flanged sleeve or liner, prior to the expansion of the latter for securing the tube in place.

Fig. 2 is a detail on a larger scale, showing in an exaggerated manner the effect produced by the expansion.

Figs. 3 to 19 illustrate various modifications of the invention.

Referring to Fig. 1, the sleeve or liner $a$ fitted inside the tube $b$ is provided with a flange $c$ abutting against the face of the plate $d$ into which the tube is to be secured. Around the inner sleeve or liner $a$ I form a series of annular projections $f$ and an intervening series of annular grooves or spaces $g$, the projections $f$ bearing against the interior of the tube $b$. The sleeve or liner $a$ has a thickened middle portion $a^1$ forming an inward annular projection; the two extremities of the sleeve are chamfered from the ends of the thickened middle portion to facilitate the flow of liquid, when the tube is in use.

The expansion of the sleeve or liner is effected for example by withdrawing the taper mandrel $e$ by an external nut $e^1$, rotated by means of a wrench (not shown), the reaction being taken upon a ring or abutment member $h$ forming part of the expansion tool. The resulting radial displacement of the projection $a^1$ forces the sleeve outwards into engagement with the tube $b$, but by reason of the provision of the spaces $g$, the outward pressure will be concentrated at the projections $f$; similarly the forces applied to the interior of the tube by these projections $f$ will be transmitted to the exterior through the deformation of the material of the tube, and a like concentration of the pressure will occur between the tube and the wall of the hole in the tube plate $d$. The end of the tube therefore assumes a slightly corrugated state, engaging internally with the spaces and projections of the sleeve $a$ and externally with the wall of the hole which it distorts to a like corrugated shape, as indicated in Fig. 2 in an exaggerated manner.

The joint thus produced is mechanically strong and resistant to high pressure.

Fig. 3 represents a modification in which the inner sleeve or liner $a$ is formed with a throat of Venturi shape, which affords the inward projection or thickened portion $a^1$ suitable for spinning or rolling by a tool $i$ to produce the radial displacement or expansion.

Fig. 4 shows a modification of the joint in which the tube $b$ is given a flared end $b^1$ to suit a chamfered hole $j$ in the tube plate; the inner sleeve or liner $a$ has its flange $c^1$ formed at a corresponding angle, providing a frusto-conical undersurface along which the series of projections $f$ and grooves $g$ are preferably continued. In the example shown, the expansion of the inward annular projection $a^1$ is effected by the insertion of a taper mandrel $e$, which is driven in until radial expansion has taken place sufficiently to make a pressure tight joint, the mandrel being then withdrawn. It will be noted that the axial thrust of the mandrel forces the projections on the conical undersurface of the flange into engagement with the flared mouth of the tube, the sleeve or liner being locked against subsequent reverse movement by the engagement of the projections upon the parallel portion of the sleeve.

The annular spaces $g$ on the exterior of the inner sleeve or liner are preferably formed as parallel grooves; such grooves may be of different depths as illustrated in Fig. 5, or of different widths as illustrated in Fig. 6. The annular spaces may also be provided by forming the outer surface of the inner sleeve or liner $a$ of outwardly convex or barrel shape, leaving upper and lower spaces $g$, as illustrated in Fig. 7, the widest diameter of the said outer surface bearing against the inner wall of the tube $b$; in such case the level of the inwardly directed projection or thickened portion $a^1$ of the sleeve will coincide with the level of such widest diameter, and the expansion of the sleeve $a$ will cause its barrel-shaped exterior to produce a corresponding bulging of the tube-end into the material of the tube plate.

Instead of making the outer surface of the inner sleeve or liner of convex or barrel shape, the annular spaces $g$ around the sleeve may be obtained by forming the outer surface with one or more outwardly projecting integral bands or zones backed on the inside of the said sleeve by one or more inwardly directed projections also integral with the sleeve. For example, Fig. 8 shows a single internal projection or thickened portion $a^1$ of the sleeve or liner $a$ coinciding with a single external band or zone $f^1$, leaving upper and lower annular spaces $g$; the expansion of the sleeve by radial outward displacement of the projection $a^1$ will cause the band $f^1$ to form a circular bulge in the tube $b$, the latter also producing a circular indentation round the wall of the hole in the tube plate $d$.

Again, Fig. 9 shows a sleeve or liner $a$ provided with a single internal projection $a^1$ and two external bands or zones $f^2$ spaced apart by approximately the depth of the internal projection $a^1$ so as to leave upper, lower and central spaces $g$. In Fig. 10, the sleeve $a$ is provided with two internal projections $a^1$ $a^2$ coinciding with two external bands or zones $f^2$; in this construction, the bore of one internal projection $a^1$ is smaller than that of the other $a^2$, so that when the liner is expanded by means of a taper mandrel (as indicated at $e$) contact will be made simultaneously with both projections to ensure even expansion of the sleeve. Fig. 11 represents a modification in which the sleeve $a$ is provided with two internal projections $a^1$ $a^2$ and two pairs of external projections $f^1$ $f^2$, each pair being adjacent to or coincident with one of the internal projections.

The annular spaces on the exterior of the inner sleeve or liner may, in another arrangement according to the invention, be formed by parallel grooves $g$ alternating with parallel projections $f$, the interior of the sleeve being similarly grooved, to provide inwardly-directed projections $a^3$ as illustrated in Fig. 12, or else formed with a single thickened portion $a^1$, as illustrated in Fig. 13. The cross-sectional shape of these grooves and projections may be part circular as illustrated in Figs. 12 and 13, rectangular as illustrated in Fig. 14, angular as illustrated in Fig. 15, or otherwise.

It will be understood that the flanged sleeve or liner may be provided integrally with any desired number of outwardly projecting and integral bands or the like separating the annular spaces, and also with any desired number of inwardly directed and integral projections, thickened portions or the like, adapted to be displaced radially outwards by mechanical pressure in the form of a taper mandrel, a spinning or rolling tool or the like.

I may also, in some cases, provide the bore of the hole in a plate $d$ to which the end of a tube $b$ is to be fixed, with a series of grooves $k$ forming annular spaces similar to the grooves $g$ in any of the modifications described, for example as shown in Fig. 16; with this provision, the tube $b$ forms an intermediate member between two surfaces each having alternating series of grooves and projections, the inner sleeve or liner $a$ having one or more inwardly directed thickened portions $a^1$ adapted to be displaced radially outwards during the mechanical sealing operation. The provision of the annular spaces $k$ in the bore of the hole will leave inwardly-extending projections $l$ which facilitate concentration of pressure on the outside wall of the tube; the two series of projections $f$ and $l$ are preferably staggered so as to assist the corrugation of the tube in the manner already explained.

In the case of securing a tube in a plate, e. g. the wall of a header, the hole in the plate $d$ for the tube $b$ may be coned as shown in Fig. 17, so that the outer end of the tube is a tight fit in the hole while the inner end of the hole is clear of the said tube. The flanged sleeve or liner $a$ is grooved exteriorly to provide the separated annular spaces $g$ and is provided interiorly with an inwardly directed thickened portion $a^1$ extending in depth below the hole in the plate $d$, so that when the mechanical pressure is applied radially outwards, and the said thickened portion $a^1$ is forced outwards, the resulting bulge of the sleeve or liner will in turn force the tube to conform with the coned shape of the hole; the tube will also be bulged or swelled out at $b^1$ below and adjacent to the inner surface of the plate $d$, as seen in Fig. 18, which represents the completed joint.

According to a further modification, illustrated in Fig. 19, the hole in the plate $d$ is enlarged for a portion of its length at $d^1$ to receive a hard-metal sheath $m$, flanged at top and bottom. This sheath is interposed between the outer wall of the tube $b$ and the plate $d$, with its top flange $m^1$ resting on the outer surface of the plate. The inner sleeve or liner $a$ is grooved exteriorly to form the separated annular spaces $g$ and provided interiorly with an inwardly directed projection $a^1$, the sleeve or liner itself depending below the hole in the plate $d$, while its flange $c$ extends over the top flange $m^1$ of the sheath $m$. Outward expansion of the beading $a^1$ on the inner sleeve or liner causes the external projections $f$ of the sleeve $a$ to engage with the interior of the tube, while bulging the latter outwards so that the hard metal sheath $m$ becomes embedded in the relatively soft metal of the plate $d$.

In applying the invention to the jointing of two tubes together, one end inside the other, the inner sleeve or liner need not be provided with a flange, its position during the operation of expansion being maintained by a tubular abutment member surrounding the taper mandrel, as already described with reference to Fig. 1. The jointing of other tubular elements can be effected in the same manner as the jointing of tubes, whether to plates or to one another.

What I claim is:—

1. A joint for tubular metallic elements, comprising a metal sleeve adapted for insertion within one tubular element to be jointed to an outer element having a hole to receive said tubular element, and an integral portion forming an inward thickening of the wall of said sleeve, the exterior of said sleeve being formed with a plurality of circumferential grooves, outward displacement of said integral portion expanding said exterior against said tubular element with the pressure concentrated on the parts of said exterior between said circumferential grooves.

2. In a tubular joint of the character described, an inner sleeve having an integral circumferential projection on its inner surface, an integral circumferential projection on its outer surface, and circumferential grooves parallel to said projection on its outer surface, said projections being located at the same distance along the axis of said sleeve and being adapted to transmit substantially the whole expansive force when said sleeve is expanded in making the joint.

3. In a tubular joint of the character described, an inner sleeve having integral circumferential projections on its inner surface, integral circumferential projections on its outer surface, and circumferential grooves alternating with said projections on its outer surface, said projections being located at corresponding distances along the axis of said sleeve and being adapted to transmit substantially the whole expansive force when said sleeve is expanded in making the joint.

4. In a tubular joint of the character described, an inner sleeve having an integral circumferential projection on its inner surface, and alternate series of circumferential grooves and projections on its outer surface, in combination with a tube plate having a hole formed with alternate series of circumferential grooves and projections on its inner surface, the projections of the respective series being staggered in relation to one another, and the tube to be jointed to said tube plate having the force exerted by expansion of said sleeve localized by said relatively staggered projections.

5. In a tubular joint of the character described, a flanged inner sleeve having an integral circumferential projection on its inner surface and alternate series of circumferential grooves and projections on its outer surface, in combination with an outer member having a hole formed with an enlarged portion, and a sheath of hard metal fitted in said enlarged portion, said sheath having a flange at one end and a beading at the other end, the flange of said sheath resting between the face of said outer member and the flange of said sleeve, and said beading becoming embedded in the wall of said hole when said sleeve is expanded in making the joint, said projections localizing the expansive force upon said sleeve.

JOHN HOGG ROBERTSON.